March 13, 1934.  C. T. WALTER  1,950,763

METHOD OF PACKING MEAT

Filed Oct. 11, 1930

Charles Taylor Walter
INVENTOR

BY Stony W. Johns.
ATTORNEY

WITNESS—

Patented Mar. 13, 1934

1,950,763

UNITED STATES PATENT OFFICE 1,950,763

METHOD OF PACKING MEAT

Charles Taylor Walter, Chicago, Ill., assignor to Swift and Company, Chicago, Ill., a corporation of Illinois Application October 11, 1930, Serial No. 487,976

1 Claim. (Cl. 99—14)

My invention relates to the meat packing industry and especially to the factory production of packed meat of a form and size adaptable to sale to consumers, especially such products as stew, hamburger steak, etc.

As is well-known, consumer demand for stew meat and ground meat has heretofore been satisfied by the retailer by preparing the required quantity from standard cuts or carcass portions. Incident to the old method of handling, there is necessarily considerable waste due to trimming, especially in the case of stew meat, for the sake of appearance and to eliminate spoiled, oxidized, and dehydrated portions, resulting from exposure and handling.

In some cases the consumer, of course, purchases one or more pieces of meat and sub-divides it into smaller portions in the consumer's kitchen, though the general custom is for the retail butcher to comminute the product.

The main objects of my invention are to provide a better method of treating meats and of handling and dispensing same, especially stew meats and ground meats; to provide a better form of apparatus for conditioning and treating such meats; to provide a better and more acceptable kind of meat package for the class of meats to which reference has been made, and to permit the factory production of comminuted meat products in packaged form at the packing house.

In practicing my invention, the product is either ground or cut up in pieces depending on whether it is proposed to use it as hamburger steak or stew, and it is then compressed agglomerately in a mold of appropriate size and shape by mechanical pressure. These forms may be designed to hold a pound or two of product, although large forms may be used for the production of large blocks to be later subdivided by appropriate means, as sawing or slicing.

After the product is placed into forms and held under pressure by mechanical means, the forms are placed in a refrigerator at a low temperature, considerably below freezing and the product frozen solid, or the outer shell thereof frozen such that the block of meat may be removed from the form by mechanical pressure and consequently kept under refrigeration until the entire block is frozen solid.

In practice, I ordinarily use forms of oblong shape, although other shapes could be used, and I prefer to manufacture in small retail size blocks rather than in large blocks to be later subdivided as before suggested, because of the length of time required to freeze a large block of product solid.

Figure 1:
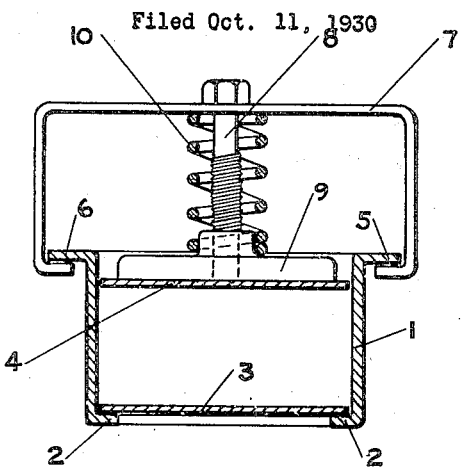
Figure 2:
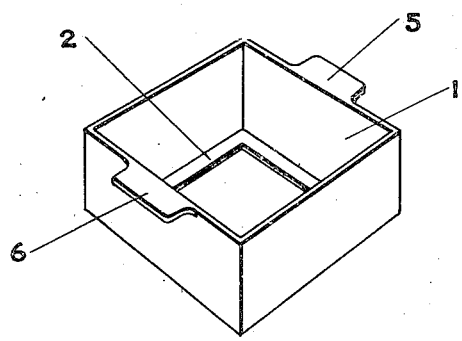

Referring now to the drawing, in which similar numerals of reference in the several figures indicate similar parts: Figure 1 is a cross section of an appropriate form. The body of the form 1 (shown in perspective in Figure 2) is provided with a flange 2 at the bottom integral with the sides to permit the insertion and retention of a removable bottom plate 3. The product is then inserted, the removable top plate 4 placed thereon, and mechanical pressure applied to force the product into conformity with the mold. Flanges 5 and 6 accommodate retainer 7, to which is secured bolt 8 provided with keeper 9, to hold a tension means as coil spring 10. Coil spring 10 urges keeper 9 downwardly against top plate 4 to hold the product under pressure while product is being frozen. If desired, plate 4 may be integral with keeper 9. After freezing as before described, bar 7 is removed from flanges 5 and 6, permitting the removal of the product by applying mechanical pressure against the bottom plate 3.

Figure 3:
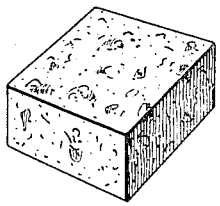
Figure 4:
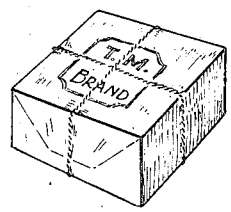

The resultant product is illustrated in Figure 3 and may be subsequently wrapped, preferably in a translucent wrapping material, as shown in Figure 4. If desired, a trade name may be displayed upon the package.

The product is then kept under refrigeration to prevent defrosting while in transit to the retailer, and while being held by the retailer prior to the sale to the consumer, thus insuring receipt by the consumer of a pure and wholesome product which has been subjected to a minimum of handling and a minimum of danger from contamination.

The usual 1# package measures approximately 4" x 4" x 2". In the case of stew meat, the meat to be packed is first cut into pieces substantially one to one and one-half cubic inches in volume, and while unfrozen, and consequently in a soft and pliable condition, is loosely packed into rectangular forms or molds such as before described, equipped with loose plate bottom supported by an inwardly extending flange integral with the side walls of the forms. After the proper quantity of meat is loosely packed into the form, the entire mass is compacted under mechanical pressure so as to produce a closely knit and agglomerate group of small elements. Mechanical pressure may be applied by an electrically operated plunger or the like.

After the pressing operation is concluded, a spring loaded cover is placed on the container and the latter is held at a temperature of 15° below zero Fahrenheit or lower, for from 15 to 30 minutes, which is sufficient to sharply freeze the product and permit it to be removed as a unit from the form. Freezing may be accelerated by applying a draft of air or other frigid fluid to the mold during the freezing process. The freezing of the mass while under pressure binds the individual pieces of meat together so that the resulting product is a rectangular object as hereinbefore described, and may be removed from the form by the application of mechanical pressure against the loose plate bottom of the form.

Although this invention is specifically exemplified, it is to be understood that many of the details set forth may be modified or omitted without departing from the spirit of the invention as defined in the following claim:

I claim:

The method of producing a meat product which consists in mechanically molding a comminuted meat product, freezing while in such molds sufficiently to permit removal of the product from the mold without appreciably altering its form, wrapping for the trade and subsequently freezing solid.

CHARLES TAYLOR WALTER.